(12) United States Patent
Adam et al.

(10) Patent No.: US 11,855,997 B1
(45) Date of Patent: Dec. 26, 2023

(54) SYSTEM AND METHODS FOR CONTROLLED ACCESS TO COMPUTER RESOURCES

(71) Applicant: THE BANK OF NEW YORK MELLON, New York, NY (US)

(72) Inventors: Christian Constantin Adam, Ridgewood, NJ (US); Mohamad Salman, Clifton, NJ (US); Jassem Shakil, Allen, TX (US); Christopher Runte, Denville, NJ (US); David Jeffrey Lunglhofer, Warrenton, VA (US)

(73) Assignee: THE BANK OF NEW YORK MELLON, New York, NY (US)

( * ) Notice: Subject to any disclaimer, the term of this patent is extended or adjusted under 35 U.S.C. 154(b) by 0 days.

(21) Appl. No.: 18/174,234

(22) Filed: Feb. 24, 2023

(51) Int. Cl.
*H04L 29/00* (2006.01)
*H04L 9/40* (2022.01)

(52) U.S. Cl.
CPC .......... *H04L 63/102* (2013.01); *H04L 63/108* (2013.01); *H04L 63/20* (2013.01)

(58) Field of Classification Search
CPC ...... H04L 63/102; H04L 63/108; H04L 63/20
See application file for complete search history.

(56) References Cited

U.S. PATENT DOCUMENTS

| | | | | |
|---|---|---|---|---|
| 8,769,642 B1 * | 7/2014 | O'Neill | ............... | H04L 63/0807 726/28 |
| 8,973,108 B1 * | 3/2015 | Roth | ....................... | G06F 21/00 726/28 |
| 9,774,586 B1 * | 9/2017 | Roche | ..................... | H04L 63/08 |
| 9,948,681 B1 * | 4/2018 | Kruse | ..................... | H04L 63/20 |
| 10,924,931 B2 * | 2/2021 | Shahine | ................. | G06F 21/10 |
| 11,134,104 B2 * | 9/2021 | Qureshi | ............. | H04L 63/0471 |
| 11,323,448 B1 * | 5/2022 | Boding | ............... | H04L 63/0876 |
| 11,509,658 B1 * | 11/2022 | Kulkarni | ............... | H04W 12/60 |
| 2014/0007222 A1 * | 1/2014 | Qureshi | ................. | H04L 67/10 726/16 |
| 2014/0157354 A1 * | 6/2014 | Marshall | ............. | G06F 21/6218 726/1 |
| 2015/0082396 A1 * | 3/2015 | Theebaprakasam | ........................ | H04L 63/102 726/5 |

(Continued)

FOREIGN PATENT DOCUMENTS

WO WO-2014047168 A1 * 3/2014 ............. G06F 21/12

*Primary Examiner* — Don G Zhao
(74) *Attorney, Agent, or Firm* — Pillsbury Winthrop Shaw Pittman, LLP

(57) ABSTRACT

Provided is a system and method for enabling of access to a computer resource by a computer system comprising: providing to a user an interface configured to receive a request for access to a computer resource; determining if the user is permitted to access the computer resource based on a user profile; providing a user verification interface configured to receive user identity verification information; determining if the user identity verification information is valid in response to a reply to the request for user identify verification information; and in response to determining that the user is permitted access to the computer resource and that the user verification information is valid: updating a security policy to reflect that the user is permitted to access the computer resource, and providing access to the computer resource for a limited time duration.

30 Claims, 12 Drawing Sheets

(56) References Cited

U.S. PATENT DOCUMENTS

| | | | | |
|---|---|---|---|---|
| 2018/0063134 | A1* | 3/2018 | Petrovykh | G06F 21/6245 |
| 2019/0258781 | A1* | 8/2019 | Qureshi | H04W 12/64 |
| 2020/0028960 | A1* | 1/2020 | Verma | H04M 1/72463 |
| 2020/0412735 | A1* | 12/2020 | Suhail | H04L 63/105 |
| 2021/0360403 | A1* | 11/2021 | Kamkar | H04L 63/108 |
| 2021/0409374 | A1* | 12/2021 | Boding | H04L 63/20 |
| 2023/0146197 | A1* | 5/2023 | Raman | G06F 40/186 |
| | | | | 704/9 |

* cited by examiner

| Example Resource | Example Operations Restricted |
|---|---|
| Internal Systems | Access to systems and network services such as certain TCP communications protocols that allow external access to systems |
| Internal Data | Access to internal databases and network file transmission services communication protocols (e.g., FTP, Microsoft SQL Server & Oracle connections (e.g., JDBC, ODBC connections)) |
| Macros (e.g., Microsoft Office Macros) | Enablement of Microsoft Excel, Word, etc. documents that perform automation including Microsoft Office Suite macros |
| Restricted Programs | Run custom programs/executables (e.g., not registered by enterprise) from remote folders and common local folders, such as temp and mydownloads; Executables (.exe) not packaged and installed in a trusted location by enterprise |
| External Systems | Connecting to non-enterprise systems or servers; perform technology activities such as automation to external systems via command line utilities (e.g., Microsoft PowerShell, PuTTY) |
| Unknown Internet Sites | Browse newly created, uncategorized websites, or the downloading of programs from the internet |
| Known Restricted Internet Sites | Browse or interact with restricted websites, e.g., social media sites |

FIG. 2

| Example Resource | Initial Access Request Time Periods |
|---|---|
| Internal Systems | Ranging from 30 minutes to 12 hours |
| Internal Data | Ranging from 30 minutes to 12 hours |
| Macros (e.g., Microsoft Office Macros) | Ranging from 30 minutes to 12 hours |
| Restricted Programs | Ranging from 30 minutes to 60 minutes |
| External Systems | Ranging from 30 minutes to 60 minutes |
| Unknown Internet Sites | Ranging from 30 minutes to 60 minutes |
| Known Restricted Internet Sites | Ranging from 30 minutes to 12 hours |

USER VERIFICATION INTERFACE 600

ENTERPRISE VERIFICATION SYSTEM

PLEASE PROVIDE THE IDENTIFICATION VERIFICATION DETAILS REQUIRED BELOW.

USER IDENTIFICATION ~610

PASSCODE (WITH MULTI-FACTOR AUTHENTICATION INPUT) ~612

[HELP] ~618    [SUBMIT] ~624    [CANCEL] ~626

PERMITTED COMPUTER RESOURCE ACCESS NOTIFICATION 650

YOUR ACCESS TO THE REQUESTED RESOURCE HAS BEEN ESTABLISHED FOR THE REQUESTED TIME PERIOD

ACCESS CONTROL FOR EXTERNAL SYSTEMS

FIG. 6B

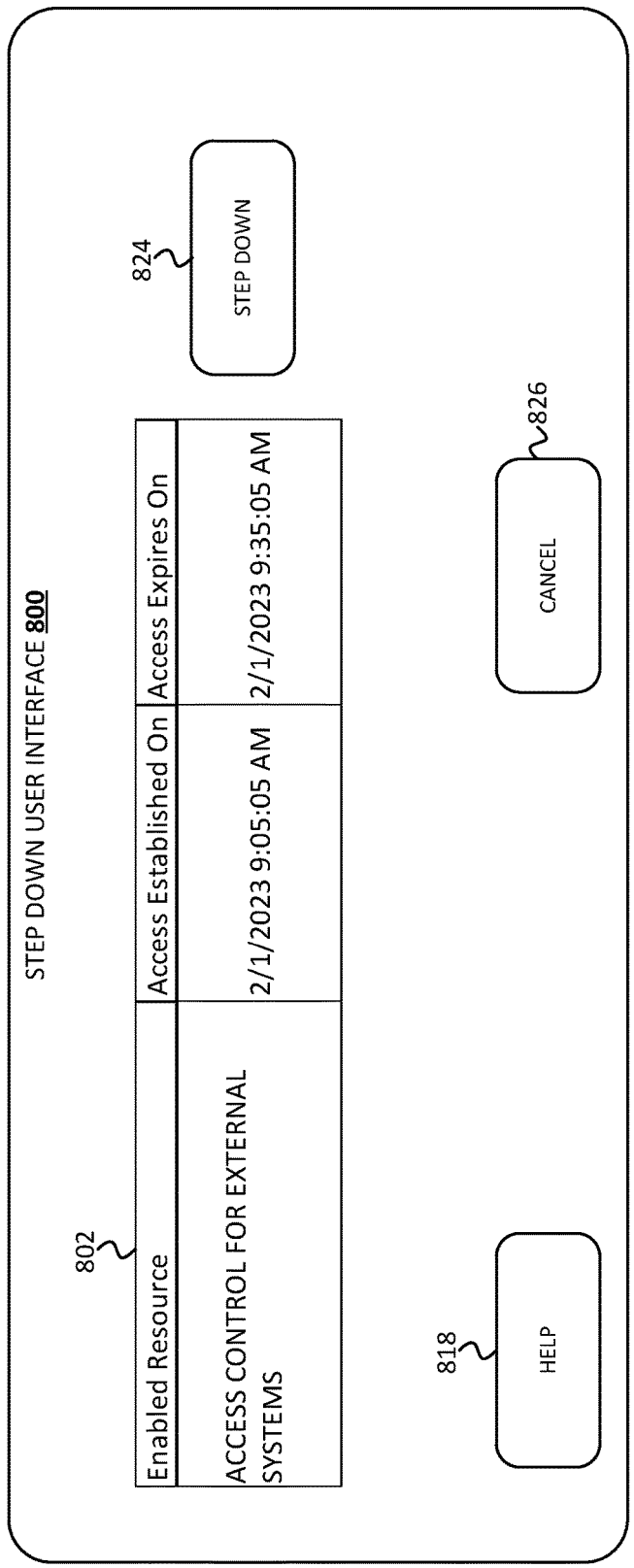
FIG. 8A
FIG. 8B

| User Group | Description | Control Status Applied to User |
|---|---|---|
| StepUpEnabled | Membership in this group may control whether a user is enabled to "Step Up" for a given computer resource. Access to these groups may require user request and administrative approval. | Disabled (Not Able to Step Up a Given Computer Resource) |
| | | Enabled (Able to Step Up a Given Computer Resource) |
| Scope | Users may be added to Scope groups, such as in an Active Directory. Once the user is in a scope group, they may be opted in to computer resource access active management. | Not Allowed (No Permission to Step Up a Given Computer Resource) |
| | | Disabled (Given Computer Resource Not Stepped Up) |
| | | Enabled (Given Computer Resource Stepped Up) |
| Scope_Disabled | Scope may be "Disabled" during Break Glass or other procedures such as at a resource, unit, or enterprise level. | Enabled (Able to Use Computer Resource Access Active Management) |
| Local Control | A user may "Stepped Up" for a given computer resource for a given amount of time, which may be tracked by a timer. The privilege may be removed when the timer expires. | Disabled (Not Stepped Up) |
| | | Enabled (Stepped Up) |
| Break Glass | A user may be added to this group to temporarily opt out of computer resource access active management. | Enabled (Stepped Up - Given User Stepped Up for a Given Computer Resource) |

| Computer Resource | Group Type | Purpose | Description |
|---|---|---|---|
| External Systems | Scope | Enable Block of External Systems | When a user is a member of the group, Control is enabled and acces to External Systems are blocked. |
| External Systems | SetUpEnable | Allow Step Up Ability | Manages whether a user is able to Step Up for External Systems access. |
| Internal Systems | Scope | Enable Block of Internal Systems | When a user is a member of the group, Control is enabled and acces to Internal Systems are blocked. |
| Internal Systems | SetUpEnable | Allow Step Up Ability | Manages whether a user is able to Step Up for Internal Systems access. |
| Internal Data | Scope | Enable Block of Internal Data | When a user is a member of the group, Control is enabled and acces to Internal Data are blocked. |
| Internal Data | SetUpEnable | Allow Step Up Ability | Manages whether a user is able to Step Up for Internal Data access. |
| Run Restricted Programs | Scope | Enable Block of Running Restricted Programs | When a user is a member of the group, Control is enabled and acces to run Restricted Programs are blocked. |
| Run Restricted Programs | SetUpEnable | Allow Step Up Ability | Manages whether a user is able to Step Up for Restricted Program access. |
| Run Macros | Scope | Enable Block of Macros | When a user is a member of the group, Control is enabled and acces to execute Macros are blocked. |
| Run Macros | SetUpEnable | Allow Step Up Ability | Manages whether a user is able to Step Up for Macros access. |
| Unknown Internet Sites | Scope | Enable Block of Unknown Internet Sites | When a user is a member of the group, Control is enabled and acces to Restricted Internet Sites are blocked. |
| Unknown Internet Sites | Just In Time (JIT) | Allow Control of Access to Unknown | Allows a user to Step Up to be added to a list for access to Unknown Internet Sites. |
| Known Internet Sites | Scope | Enable Block of One or More Known Internet | When a user is a member of the group, Control is enabled and acces to Restricted Known Internet Sites are blocked. |
| Known Internet Sites | Just In Time (JIT) | Allow Control of Access to Unknown Internet Sites | Allows a user to Step Up to be added to a list for access to one or more Known Internet Sites. |
| Break Glass Allow | Break Glass | Allow Access to All Resources | When a user is added to this group, all access controls for one or more computer resources are turned off. |

FIG. 10

SYSTEM AND METHODS FOR CONTROLLED ACCESS TO COMPUTER RESOURCES

TECHNICAL FIELD

The present disclosure relates generally to computer resource access control, and more particularly to systems and methods for enabling and/or disabling access to a computer resource.

BACKGROUND

An enterprise may permit access and connectivity to (e.g., allow employees, contractors, or other users to use) multiple computer resources, which may be resources within an internal (e.g., corporate) network, external resources (e.g., external websites, servers, etc.). The enterprise may have various levels of connectivity, such as allowing access to all internal resources, or—as an example—blocking access to all external resources. Within the internal network (or even for access points to external resources), users may be permitted access to multiple resources, which may be unnecessary (to the user, to the enterprise, etc.). The enterprise may not differentiate between internal resources that a user needs, such as for performing enterprise related activities, internal resources that a user may use occasionally, internal resources that a user does not need access to (such as internal resources a user never needs), etc. From the internal network, a user may be permitted access to multiple external resources, which, likewise, may be permitted or denied in a binary (or ON-OFF) manner and may not be filtered or restricted based on the user and user's needs. That is, internally but also externally, endpoint-initiated connections (e.g., from a user to a resource) and access methods may not be distinguished by user identity, user intent, etc.

Controlling access to certain resources (e.g., applications, connections, operations, services, etc.) may often be a role, group, or network-location-based determination. For example, access may be restricted based on roles, assigned privileges, or location of individuals within an enterprise (e.g., internal users, external users such as VPN users, etc.). Users may be collectively permitted access to information and connections that may be needed to perform relevant tasks and likewise restricted from access to information or resources that do not pertain to them.

SUMMARY

The following is a non-exhaustive listing of some aspects of the present techniques in accordance with various aspects of the present invention. These and other aspects are described in the following disclosure.

Some aspects include a method for enabling access to a computer resource comprising: providing, by a computer system, to a user an interface configured to receive a request for access to a computer resource; determining, by the computer system, if the user is permitted to access the computer resource based on a user profile of the user; providing, by the computer system, a user verification interface configured to receive user identity verification information; determining, by the computer system, if the user identity verification information is valid in response to a reply to the request for user identify verification information received from the user; and in response to determining that the user is permitted access to the computer resource and that the user verification information is valid: changing a configuration of a network resource associated with the user to permit the user access to the computer resource, and providing, by the computer system, access to the computer resource for a limited time duration.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

Features, aspects, and embodiments of the present disclosure are described in conjunction with the attached drawings, in which:

FIG. 2 depicts a chart listing example computer resources for access control, in accordance with some embodiments of the present disclosure.

FIGS. 4A-4B are schematic views illustrating example user interfaces for computer resource requests, in accordance with some embodiments of the present disclosure.

FIG. 5 depicts a chart listing example computer resources and initial access request time periods, in accordance with some embodiments of the present disclosure.

FIGS. 6A-6B are schematic views illustrating an example user interface and alert, respectively, for user identity verification for access control, in accordance with some embodiments of the present disclosure.

FIGS. 8A-8B are schematic views illustrating an example user interface and alert, respectively, for step down, in accordance with some embodiments of the present disclosure.

FIG. 9 depicts a chart listing example user group types and statuses for access control, in accordance with some embodiments of the present disclosure.

FIG. 10 depicts a chart listing example groups and purposes for access control, in accordance with some embodiments of the present disclosure.

Figure 1:
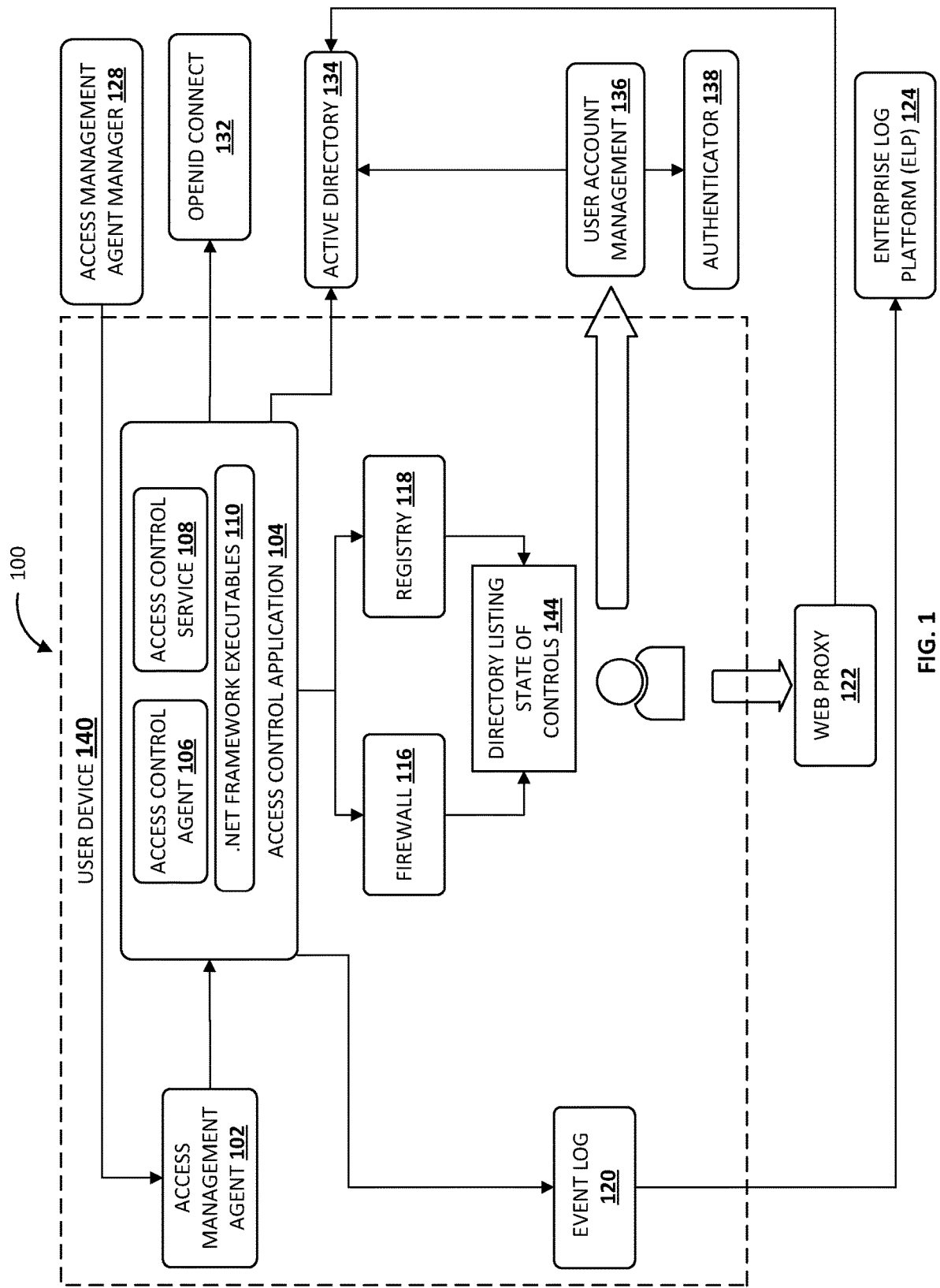
FIG. 1 is a schematic diagram depicting an example access control system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the field of access control. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

While some of the embodiments below are described in relation to enabling of access to a computer resource or other access control, it will be understood that the systems and methods described herein may apply equally to logging of access to a computer resource, restricting of access to a computer resource, enabling of access to other resources, etc. Other resources may include, for example, physical drives, such as removable media and peripherals, (e.g., universal serial bus (USB) drives, USB peripherals, etc.). Other operations may include monitoring, including, without limitation, using anomaly detection or behavior analysis, of user behavior, grouping of users based on user behavior, controlling of user access to computer resources based on membership of a user in one or more user group, to name just a few. Thus, the following descriptions should not be seen to limit the system, methods, and machine-readable medium described herein to any particular type of access enabling or restricting operation.

As discussed above, an enterprise may have various reasons for controlling access to one or more computer resources. Internal computer resources may be protected, such as by a firewall, from external users, while internal users may be restricted from accessing one or more external resources which may be deemed unsafe—of even just unknown or of unknown safety. Especially as remote users have increased, an enterprise may also have external users (e.g., remote access users including enterprise users who are external or outside of the enterprise network, such as users working at home, users at client sites, etc.) who use an avenue to appear as internal users (such as a virtual private network (VPN)). Traditionally, internal users, including remote access users who have passed one or more security check and are treated as internal users, may have access to substantially all internal computer resources, such as internal drives, internal application, internal websites, etc. Within the internal network, internal users are generally not restricted from individual resources, nor questioned as to why they need access to the individual resources—access may be granted as a "blanket" or universal permission. This may present a security risk, as once a user is identified as an internal user for enterprise purposes (including due to malicious behavior such as hacking, spoofing, etc.), they may access sensitive computer resources.

In some cases, internal users may be restricted from accessing some internal or external computer resources, but may be able to request access. Most enterprises place at least some control on external computer resources, such as by using one or more firewalls, but may allow users to request access to external resources, such as external websites, external servers, etc. In some cases, once access is requested (and approved) to a restricted internal or external resource, the access to the resource may be indefinite (e.g., approved in perpetuity). Security departments may review access periodically, such as every 6 months, if at all. The access may further be granted based on user characteristics, such as user membership in one or more groups, and may therefore grant access to a user who does not require such access. Access granted to a user may thereby weaken security controls, as a malicious actor acting as the user may inherit the permissions (e.g., computer resource access) granted to the user. The more users who have access to a computer resource, such as an internal database, the less secure that resource may be.

For these and other reasons, blanket access to computer resources (or other resources) may be too broad an approach and may represent a security risk to an enterprise. However, restricted access (e.g., blocking access to the internal and external computer resources) such as by removing the resources from the internal network, air-gapping the computer resources, blocking external resources, etc., may present challenges—as access to such computer resources is needed by at least some users to complete enterprise-related tasks. For example, an enterprise may block user access to social media sites, such as for productivity reasons, to prevent confidential information being shared from enterprise devices, etc. But certain users (such as employees in marketing, communications, certain regulatory units, legal departments, etc.) may need access to such blocked social media sites in order to perform certain aspects of their jobs.

Granting access to users, such as those who need access to a computer resource which is generally restricted, may be a time consuming and burdensome process, requiring multiple levels of approval, resource intensive on the security apparatus, irritating for users finding that they require more access than currently granted, etc. Herein, "security apparatus" is used to refer to information security, data security, physical security (e.g., physical access restriction), information technology (IT) and other security operations, departments, employees, and applications. A security apparatus may consist of multiple operators, both human and automated, such as under the direction of a security office, information security office, etc. Granting access to users may also be a static entitlement, e.g., granted for a particular resource and a particular time frame (which may be an indefinite or limited time). Because granting of access may be burdensome, both users and security apparatuses may be inclined to grant access for a longer time period that strictly needed, such as granting indefinite access to a computer resource the user only needs to access for a limited time or occasionally. Such static access may present a security vulnerability, as it may linger beyond its necessary lifetime and present an unnecessary avenue for access, such as if a user identity is compromised.

Because of these and other reasons, a real-time, just-in-time, or just-enough-time access to a computer resource presents a technical advancement. A system which can provide such access to one or more computer resources, may further include authentication ability, which may verify that the user requesting access is in fact the user behind the request and is substantially not a malicious actor impersonating the user and requesting access. Such a system, and method of enabling access, provides increased security while enabling enterprise tasks to be completed by users, including without significant imposition on the user. The enabling of access as needed and as-long-as needed, including with authentication of user identity, has security benefits for enterprises.

Herein, "external" may be used to refer to computer resources, databases, software, tools, internet sites, etc. which operate outside of an enterprise's network, proxy, firewall, control, etc. In some situations, certain external resources may be or may be assumed to be vulnerable to manipulation, including by malicious actors, which are not under the control of (or cannot be reasonable assumed to be under the control of) the enterprise. "Internal" may be used to refer to computer resources, databases, software, tools, etc. which operate inside of an enterprise's network, proxy, firewall, control, etc. In some situations, certain internal resources may be reasonably assumed to be under the control of the enterprise. Internal items and services may be protected, including from subsets of users associated with the enterprise, such as by having restricted permissions, requiring logins, etc. The terms "internal" and "external" are not restrictive of physical locations, as internal resources may be hosted in one or more external physical locations (e.g., databases, cloud services, etc.), while one or more external resources may be accessed from one or more internal physical locations, such as buildings controlled by the enterprise. Internal users may also include remote access users, such as users who VPN or otherwise enter an internal network. External users may include users physically present at an internal location, such as customers, contractors, trainees, etc. who are not registered users, may have access (such as restricted access) to an internal network.

FIG. 1 is a schematic diagram depicting an example access control system 100, in accordance with some embodiments of the present disclosure. An instance of the system 100 may operate on a user device 140, which may be a user endpoint device, such as an internet-capable computer hardware device (e.g., laptop, desktop computer, tablet, smart phone, point of sale device, automated teller machine (ATM), etc.). The user device 140 may operate based on an operating system (OS), such as, for example, Windows 10 (or other versions), macOS, mobile operating systems, or another appropriate operating system. For example, the user device 140 may be a mobile device and may operate on a mobile OS. For ease of description, terminology is used which may correspond to an item (e.g., registry, directory, agent, etc.) in a specific OS, but it should be understood that equivalent (or even semi-equivalent) items may be used instead in implementation in other OSs, such that the disclosure is compatible with various OS, computer architecture, network structure, etc. The user device 140 may contain an application 104 (e.g., an instance) of the access control system 100. The application 104 may be a background application, an application which initiates on startup (or based on a user login), a user-initiated application, etc. The application 104 may be stored on the user device 140. The application 104 may be loaded (e.g., uploaded, installed, etc.) onto the user device 140, such as when the user device 140 is initially set up (for example, set up by an agent of the enterprise). The application 104 may also operate based on an application, a database, etc. stored on an external device (e.g., external to the user device). For example, the application 104 may, such as when connected to an internal network such as by Wi-Fi, interact with a user database stored on an internal network, server, etc.

The application 104 may be built on a .net framework, such as including .net framework executables 110. The application 104 may operate on any appropriate framework. The application 104 may include an agent 106, which may be an access-on-demand agent. The agent 106 may be an interface agent, which the user may interact with, such as via the user device 140. The application 104 may include a service 108, which may be an access-on-demand service. The service 108 may be a service agent, which may interact with one or more server, such as from the user device 140. Operations herein which are described as being performed by a service may instead be performed by an agent, and vice versa.

The application 104 may provide access to one or more computer resources. A computer resource may be hardware, software, communication devices, facilities, equipment, networks, data files, data stores, policies, programs (e.g., Microsoft Office macros), system processes, websites (e.g., internet sites and/or intranet sites), services, systems, and/or the like or components of one or more of the foregoing. As described in this disclosure, in certain embodiments a computer resource may be an internal resource. In certain embodiments, a computer resource may be an external resource. The application 104 may interact with one or more active directories 134, which may store a list of entitlements for one or more users. The active directory 134 may store a list of users, groups of users, etc. The active directory 134 may indicate whether one or more users are entitled to request access to one or more computer resources. The active directory 134 may be stored on an internal server (not pictured). The user device 140 may communicate with the active directory 134, on another computing device. A portion of the active directory 134, including a duplicate of a portion of the active directory 134, may be stored on the user device 140. For example, entitlements associated with the user of the user device 140 may be stored on the user device 140. The active directory 134 may store a list of positive entitlements (e.g., computer resources a user may request access to), a list of negative entitlements (e.g., computer resources a user is restricted from requesting access to), or a combination thereof. The active directory 134, including a portion of the active directory 134 stored on the user device 140, may be updated, such as by the enterprise, based on changes in the user's condition, enterprise demands, external events (for example, server maintenance), etc. The active directory 134 may be stored in or an operation of Windows Domain Controller. The application 104 may query the active directory 134, such as when providing a user interface from which a user may request access to a computer resource, when providing a requested computer resource, etc. The application 104 may query the active directory 134 as-needed, periodically (such as every 15 minutes), or at other times or cadences. The application 104 may push or pull entitlements for a user from the active directory 134.

The application 104 may enable access to some computer resources, for example, access to external systems and/or access to internal systems, by modifying a firewall 116. The firewall 116 may be a Windows Defender according to some embodiments. The firewall 116 may instead be another type of firewall, such as a firewall corresponding to the OS of the user device 140. The firewall 116 may be modified, such as by .net libraries, to provide access to the user for a computer resource as provided by the application 104. The firewall 116 may have a baseline or default setting, including a baseline setting in which the firewall 116 blocks access to substantially all computer resources.

The application 104 may enable access to some computer resources, for example, access to internal data and/or access to run restricted programs (which may be computer resources that operate inside a firewall such as the firewall 116), by modifying a registry 118. In certain embodiments, registry 118 may be a Windows registry. In other embodiments, the registry 118 may be instead another type of registry, such as a registry corresponding to the OS of the user device 140. For example, the registry 118 may be a security policy (e.g., a Mac security policy), a Linux based file, etc. The registry 118 may manage a user's ability to run programs, run macros (such as Windows macros), etc. The registry 118 may be modified, such as by .net executables, based on the entitlement(s) of a user, such as by reference to the active directory 134.

The application 104 may record the state of the firewall 116 or the registry 118 (or other firewalls, registries, etc.) in a directory 144 listing the state of various controls. The directory 144 may include a listing of the current state of controls, a historic listing of the state of controls, a listing of changes (including time stamps) in the state of controls, etc. The directory 144 may be a local directory. The directory 144 may be provided to an enterprise-level server, security team, etc. Changes to the firewall 116 or the registry 118 may be posted to the directory 144.

The application 104 may also or instead record the events, such as changes in access to computer resources, request for access, approval of access, termination of access, etc. to an event log 120. The event log 120 may be instead or additionally another type of log, such as a log corresponding to the OS of the user device 140. The event log 120 may be a local log, to which events may be logged by the application 104. The event log 120 may communicate with an enterprise log, such as hosted on an enterprise log platform (ELP) 124. The event log 120 may forward events, multiple events, log entries, etc. to the ELP 124, which may be any appropriate log platform. The event log 120 may be forwarded to a data analysis system for log analysis.

The application 104 may interact with an access management agent 102. The access management agent 102 may elevate agent privileges to enable the application 104 to control the access controls on the user device 140. The access management agent 102 may interact with an access management agent manager 128, which may be a privilege management for Windows or another appropriate OS manager. The access management agent manager 128 may be remote from the user device 140, such as on an enterprise level server, database, etc.

The application 104 may enable access to some computer resources, for example, access to internal data and to run restricted programs, by communicating to the access management agent 102. The access management agent 102 may operate to control a user's ability to run executables, such as in restricted programs, in macros, etc., or to run executables which are outside of a temporary directory. The access management agent 102 may, in response to a request from the application 104 to allow a user access to a computer resource, elevate or enable a user's privileges in order for the user to have access to the given computer resource.

The application 104 may enable some computer resources, for example, access to unknown internet sites, access to known and restricted internet sites, etc., by communicating with an user account management system (UAM) 136, such as AccessHub or another identify account management system The UAM 136 may communicate with the user device 140 by Hypertext Transfer Protocol (HTTP). The UAM 136 may communicate via a specific port. A user, when requesting access to a restricted internet site (which may be substantially all internet sites not found on an allow list, internet sites on a block list, or another combination thereof), may be redirected to the application 104 or a user interface thereof. The user may request access to the internet site by interaction with the UAM 136, which may communicate with the active directory 134 to determine if the user is entitled to access to the computer resource (e.g., internet site). The UAM 136 may trigger an authenticator 138 to initiate or operate one or more authentication operations for the user. The one or more authentication operations may include one or more multi-factor authentication operations according to various embodiments. For example, a multi-factor authenticator may initiate or operate a multi-factor authentication operation for the user. The authenticator 138 may communicate with the application 104 or the active directory 134. A successful authentication by the authenticator 138 may cause the application 104 to permit the user access to one or more computer resources. The authenticator 138 may be a GIS Adaptive Authentication, or any other appropriate authenticator.

The application 104 may enable some computer resources, for example, access to unknown internet sites, access to known and restricted internet sites, etc., by communicating with a web proxy 122. The web proxy 122 may be a McAfee Web Gateway (MWG) or any appropriate web proxy. The web proxy 122 may operate via a specific port, such as the HTTP:443 port. The web proxy 122 may determine that the user is trying to navigate to a restricted internet site (which may be a known or unknown internet site), download a restricted executable (which may be a known or unknown executable, such as an executable from a known source (e.g., Microsoft) but hosted outside of the internal network), etc. The web proxy 122 may communicate with the user device 140 by HTTP or any other appropriate protocol. The web proxy 122 may determine, such as based on the active directory 134, whether the user is entitled to navigate, download, etc. the restricted content (e.g., internet site, executable, etc.).

The application 104 may enable, for example, access to external systems, internal systems, internal data, to run restricted programs, to run macros, etc. via an OpenID Connect 132. The OpenID Connect 132 may be a Ping Federate software, service, operation, etc. The OpenID Connect 132 may be called by the agent 106 or other element of the application 104. The OpenID Connect 132 may be an application programming interface (API). The OpenID Connect 132 may prompt a user (e.g., of the user device 140) to enter, confirm, validate, etc. user credentials, user identify information, etc. The OpenID Connect 132 may be or include an authentication, such as by being in communication with the authenticator 138.

The system 100 may allow real-time access for a user to one or more computer resource. "Real-time" as used herein may include substantially real-time events, such as events occurring with no time lag or with a time lag, but a time lag which does not significantly impede enterprise function (e.g., access to a computer resource within 30 seconds of a request, within 2 minutes of a request, etc.) Other time periods may be contemplated within the scope of this disclosure.

"Real-time" may include one or more intervening steps. That is, real-time access may include access which requires one or more intermediate steps following the request. These steps may include, without limitation, one or more steps associated with an attempt to navigate to an internet site, logging in to a user verification system, authentication, etc.

The system 100 may allow just-in-time access for a user to one or more computer resources. "Just-in-time" (or JIT) may include substantially just-in-time events or provision (as of computer resources) as they are needed, such as by a user, by the enterprise, etc., which may include a delay, such as to the user or the enterprise, between requesting of the access and enabling of access to the computer resource. "Just-in-time" may include delivery of a computer resource based on a request of the user or enterprise. For example, a pop-up window or interface for requesting a computer resource may be triggered by a user action in another application, such as logging into a user device 140. "Just-in-time" may not require that a computer resource be delivered (e.g., provided to the user) automatically based on user behavior. For example, the request for the computer resource may require or begin with an active request by the user—that is, an interface for requesting the computer resource may be triggered by a user action specific to that interface, such as launching the interface from an application menu, and the interface for requesting the computer resource may not be automatically provided to the user. "Just-in-time" may not imply that any such delivery of a computer resource excludes user identify verification, user eligibility determination, etc. That is, just-in-time computer resource access may require a user request for access. The system 100 may allow for just-enough-time access for a user to one or more computer resources. "Just-enough-time" may include incremental time, which may or may not be extendable, for access to the computer resource. "Just-enough-time" may not require that a computer resource be enabled for as long as the user has need of it or that the necessary time duration for access be determined by the system 100. For example, the enablement of the computer resource may be for a set increment. In another example, the enablement of the computer resource may be provided for an increment which is determined based on a task type, task identity, etc. For example, the enablement of the computer resource if the user selects "look up customer ID" from a drop-down menu may be shorter than if the user selects "customer ID database maintenance" from the same drop-down menu. Further, various tasks may be approved for some users and not others, or set increments provided in different lengths for various users. Just-enough-time may be limited by the system to a reasonable time, such as the length of an average employee workday, business hours, etc. Just-enough-time may include the ability of the user to disable access to a computer resource if the user has finished a task (e.g., step down the computer resource).

The system 100 may provide a default opt-out system for access to one or more computer resources. That is, the system 100 may provide conditional access to some computer resources, which may be different from traditional systems for access to computer resources which may provide a default opt-in (e.g., static access for substantially all). The system 100 may improve computer resource security, internal network security, etc. by limiting the access to various computer resources to users with permissions, users with reasons for requesting access, etc.

The system 100 may allow access to one or more computer resources only when explicitly requested by a user. The system 100 may distinguish between access to a computer resource which is requested by a user versus access which is available at a system level (e.g., system access). The system 100 may provide elevated access to one or more computer resources only (or substantially only) when necessary, such as by a default blocking of such resources. The system 100 may include additional controls, such as multi-factor authentication, user identification verification, user group controls, etc., in order to validate a request for elevated access to a computer resource. The system 100 may include a time or other operation to implement a limited time duration of access. The system 100 may limit access to a computer resource to a finite time, e.g., a limited time duration, for each user. The system 100 may increase monitoring opportunities, such as for the enterprise, for a security apparatus of the enterprise, etc., such as by logging request from the users for access to one or more computer resources, tracking which users have access to a given computer resource at a given time, etc.

FIG. 2 depicts a chart 200 listing example computer resources associated with an access control system, in accordance with some embodiments of the present disclosure. The chart 200 provides example resources, which may be computer resources. The resources may be internal resources, external resources, software resources, hardware resources, etc. The resources may be computer resources (e.g., computer access, computer-based, etc. resources). A restricted resource may be a resource (e.g., an operation, an application, a database, a server, etc.) to which access is controlled (e.g., restricted). Some resources may be unrestricted, for which access is not controlled. For example, a keyboard may be considered a computer resource, as it receives external input. Access to a keyboard of a user device may be unrestricted (or semi-restricted), such that a user may access a login to unlock the user device. A restricted operation may be one or more steps, tasks, activities, processes, pieces of work, etc. that may be restricted from being performed by or accessed from a given device, which may be a user device. A restricted operation may involve restricted resources. A restricted operation may be restricted substantially always. For example, a restricted operation may be connecting to a known malicious website which may be restricted for substantially all users, including users who generally have heightened or increased permissions or access within the enterprise. A restricted operation may be enabled substantially always or for substantially all users within an enterprise. For example, a restricted operation may be connecting to an internal employee website, for which substantially all users may be allowed to request access and for which substantially all users are approved for access if access is so requested. A user may be an employee, consultant, contractor, or any other agent or representative of an enterprise. An enterprise may be a commercial organization, a nonprofit organization, a group, an association, a society, or other environment in which access to one or more computer resources are managed and/or provisioned. A user device may be a computing device provided by an enterprise or otherwise allowed access to information and/or one or more computer resources of the enterprise or one or more computer resources managed or provisioned by the enterprise.

Access control for a computer operation may not involve restriction of a particular software, hardware, application, etc. (e.g., control of a restricted resource) but rather restriction of one or more restricted operations performed or performable in connection with the software, hardware, application, etc. (e.g., the restricted or unrestricted resource) For example, running Microsoft Office may not be a restricted operation, but accessing to one or more macros within Microsoft Office may be a restricted operation. For example, macros that allow access to external computer resources or the execution of .exe files, for example, may be blocked.

The chart 200 provides example resources, which include internal systems, internal data, macros, restricted programs, external systems, unknown internet sites, and known restricted internet sites. It is understood that additional and/or alternate resources may be used within the scope of this disclosure.

The chart 200 also provides example operations which may be restricted for each of the example resources. For example, access to internal systems may be restricted by restricting access to systems and network services such as certain transmission control protocols (TCPs) that allow external access to systems. Access to internal data may be restricted by restricting access to one or more internal databases, network file transmission services, communication protocols (e.g., FTP, Microsoft SQL Server, Oracle, etc. connections, such as Java Database Connectivity (JDBC), Open Database Connectivity (ODBC), etc.). Access to macros, which may be MS Office macros, may be restricted by restricting access to Microsoft Excel, Word, and other documents, files, etc. which perform automation including the MS Office Suite macros, User Defined Types (UDT), Microsoft add-ins, etc.

Various programs may be restricted by restricting access to run programs or executables (e.g., programs or executables not registered to or by the enterprise). Restricting access to run programs may cover requests to run such programs from remote folders, from common local folders (including temp folders, download folders, etc.), from some locations but not other locations. For example, a program installed in an enterprise-approved location (such as by a security apparatus of the enterprise) may be allowed to run, while the same program installed in a location which is not the enterprise-approved location may be prohibited from running Various programs may be restricted by restricting access to run executables (e.g., .exe), such as executables not packaged, installed, approved, by the enterprise or the enterprise's software center (or the enterprise's security apparatus). Access to external systems may be restricted by restricting connections (or connecting) to non-enterprise systems or servers, to perform technology activities such as automation to external systems such as via command line utilities (e.g., via Microsoft PowerShell, PuTTY, etc.) Access to unknown internet sites may be restricted by restricting access to browse newly created, uncategorized, etc. websites or the downloading of information (e.g., images) or programs from the internet. Access to various known but restricted internet sites, such as internet sites on a block list, may be restricted by restricting access to sites on the internet sites on the block list by firewall or by any other appropriate method. It is understood that alternate or additional operations may restricted in connection with one or more computer resources within the scope of this disclosure.

Access to a computer resource may be "stepped up", which may refer to a change in one or more access permissions of the computer resource from restricted to accessible (e.g., enabled) for a given user. Herein, "stepped up" (and its cognates) refer to a process or state of access enablement for one or more computer resources for a given user. Access to a computer resource may be stepped up for multiple users at the same time. A user may also request, and may receive, stepped up access for multiple computer resources at the same time. Access to a computer resource may be stepped up such that a user is able to access the computer resource. In various embodiments, access to a computer resource may be "stepped down". Herein, "stepped down" (and its cognates) refer to a process or state of access restriction for one or more computer resources for a given user. Access to a computer resource or the computer resource itself may alternatively be referred to as blocked. Access to a computer resource need not have been "stepped up" to become "stepped down". Stepped down may refer to a baseline access state of a resource. Access to a computer resource may be referred to as "stepped down" for a given user, even if the given user may not "step up" or be allowed access to the given resource. For example, access to internal data may be stepped down for a user who is not permitted access to the internal data.

Figure 3:
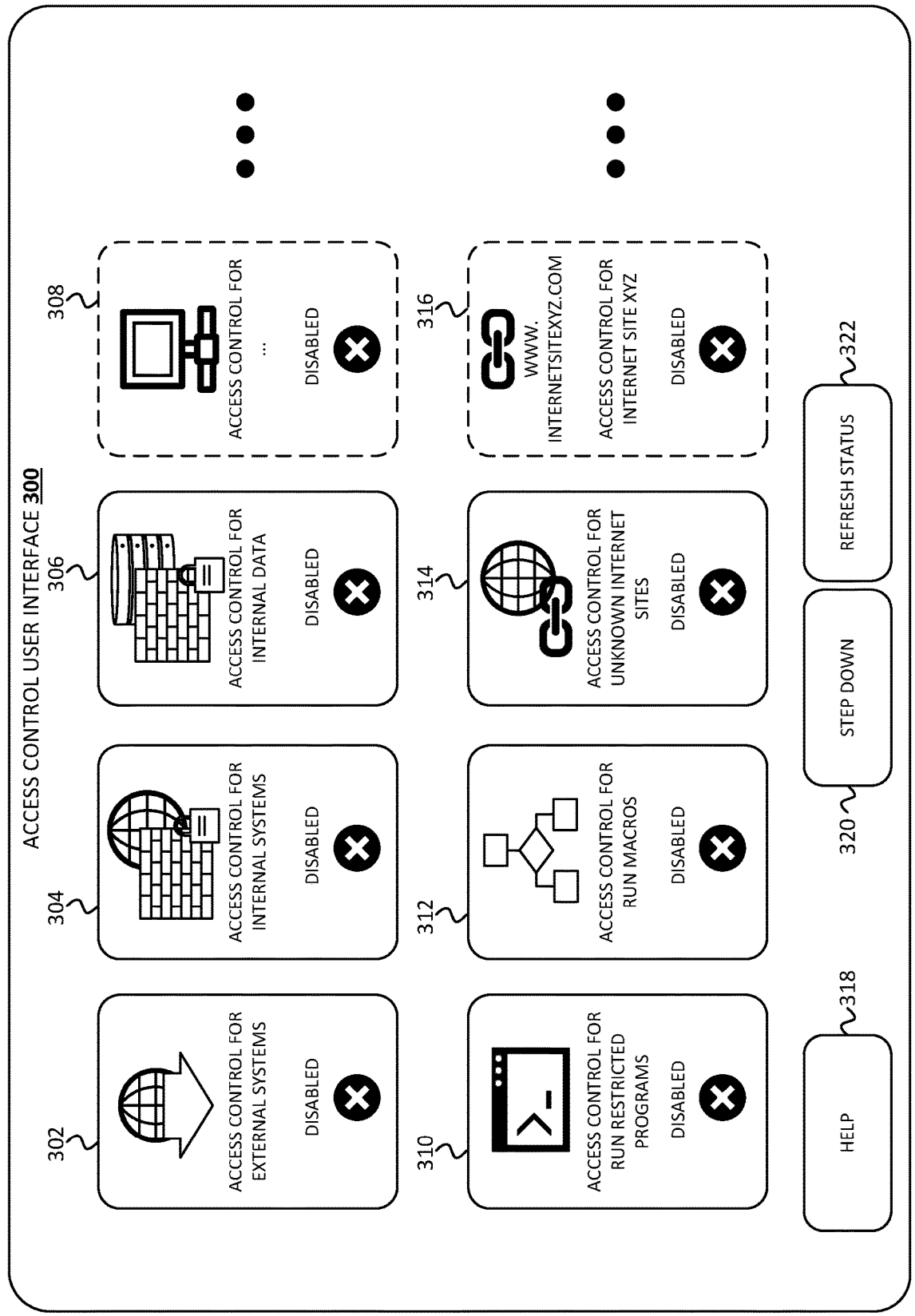
FIG. 3 is a schematic view illustrating an example user interface for performing access control to computer resources, in accordance with some embodiments of the present disclosure.

FIG. 3 is a schematic view illustrating an example user interface 300 for access to computer resources, in accordance with some embodiments of the present disclosure. The user interface 300 may be provided on a user device, such as the user device 140 of FIG. 1. The user interface 300 may be automatically provided, such as upon login to the user device. The user interface 300 may be provided based on a user attempting to access a computer resource for which the user's access is restricted. For example, a user interface, such as the one illustrated in FIG. 3, may be provided when a user attempts to navigate to a restricted internet site, attempts to run a restricted executable, etc. Access may be provided to restricted resources and restricted operations in the user interface 300. The user interface 300 may group restricted resources and restricted operations (such as those operations performed with given resources) together. For example, a restricted resource such as an unknown website may be grouped with a restricted operation, such as navigating to the unknown site. Hereinafter, it should be understood that a computer resource may include a computer operation (such as an operation involving the computer resource) or that a restricted resource may include or instead be an restricted operation. The user interface 300 may allow the user to select a category of computer resource for which the user seeks access. The categories of computer resources may be tailored to the enterprise, to the user, to a user group, etc. The user interface 300 may include categories of computer access, such as access to external systems 302, access to internal systems 304, access to internal data 306, access to run restricted programs 310, access to run macros 312, access to unknown internet sites 314, access to a known restricted internet site 316, and access to a custom computer resource 308. It is understood that additional and/or alternate categories may be used within the scope of this disclosure.

The user may select a category from the user interface 300 by clicking or otherwise selecting a category, icon, item from a drop down menu, etc. Each category may indicate whether the computer resource is currently disabled (or "stepped down") or enabled (or "stepped up"), which may include an indication of how long (such as of the limited time duration) remains in the enabled time period. Each category may include a display of an icon corresponding to the computer resource.

The user interface 300 may include a link or other option for help 318 or explanations of the various options for a user. The user interface 300 may include a link or other option to step down 320 one or more computer resources for a user. The user interface 300 may include a link or other option to refresh status 322 of access to the various computer resources.

The user interface 300 may correspond to a software application that resides on a user device. The software application may be an agent. The software application may be accessed directly, which may cause the user interface 300 to be displayed. The software application may be opened in response to a user attempting a restricted operation, which may cause the user interface 300 to be displayed.

In response to a user selecting a computer resource, such as by selecting an icon corresponding to the computer resource, the system may display a form (or other interface) for the user to request access to the computer resource.

FIGS. 4A-4B are schematic views illustrating example user interfaces for computer resource requests, in accordance with some embodiments of the present disclosure. FIG. 4A depicts a schematic view of a computer resource request interface 400. The request interface 400 may include information about which computer resource is being requested (such as in response to selection of the computer resource in a user interface such as the user interface 300 of FIG. 3). The request interface 400 may include a text box 410, drop down menu, or other input element, which may allow a user to select a time duration for requested access to the computer resource. The options may be time intervals, such as 30 minutes, 1 hour, several hours, etc., which may vary depending on the computer resource. The time intervals may be designed to accommodate an average task which may be performed by a user with the computer resource. Examples of the time intervals are provided in FIG. 5.

The request interface 400 may include a text box 412, drop down menu, or other input element, which may allow (or require) the user to input a reason (e.g., business justification), as a text string, free text, select from prepared responses, etc. that explains why the user request access to the computer resource. The business justification may be stored in a log, reported to a security apparatus, etc. The user may be required to submit a reason before access will be granted. The request interface 400 may include a link or other option for help 418 or explanations of the various options for a user. The user interface 400 may include a link or other option to submit 424 the request for the computer resource. The user interface 400 may include a link or other option to cancel 426 the request for the computer resource.

FIG. 4B depicts a schematic view of an unpermitted computer resource notification 450. A user who is not permitted to step up access for a given computer resource may receive the unpermitted computer resource notification 450. An unpermitted computer resource notification may be displayed to a user instead of the request interface 400 of FIG. 4A. The user may, alternatively, not be able to select a category of computer resource, such as via the user interface 300 of FIG. 3, which they are not permitted to access. This may include graying out of a given computer resource, removing the computer resource icon, link, etc. from the user interface 300, etc. The unpermitted computer resource notification 450 may include a link or other option to request permission 454, such as from the enterprise, from a security apparatus, etc. The unpermitted computer resource notification 450 may include a link or other option to close 456 the notification. An explanation of the reason the computer resource is not permitted may also be provided.

FIG. 5 depicts a chart 500 listing example computer resources and initial access request time periods, in accordance with some embodiments of the present disclosure. Time durations may be selected by the user for a given computer resource from the example time periods, such as in 30-minute increments. In some embodiments, a user may be able to extend a time duration for access to a computer resource without interrupting access to the computer resource. A user may be able to submit a request (e.g., a subsequent step-up request) before expiration of an initial duration of access that has been enabled with respect to the computer resource. The subsequent step-up request may function to extend the initial step-up request in time duration. Extending the access to the computer resource may reset a timer to the duration of the second (or most recent) request for access and may not add time to the initial time duration. Alternatively, extending access to the computer resource may add time to a timer associated with the initial time duration. The subsequent step-up request may occur in the same manner as the initial step-up request.

As seen in FIG. 5, the available initial access request times may vary depending on the computer resource. A minimum time duration, which may be a minimum time duration request increment, may be provided. For example, an initial access request time period may be 30 minutes, 5 minutes, etc. A maximum time duration, which may be a multiple of a minimum time duration request increment, may also be provided. The minimum and maximum time durations may vary depending on the resource identity, such as based on an average time for a task using the computer resource, relative security threat to the computer resource, etc. For example, a maximum time duration for an internal system or a known but restricted internet site may be set to a time duration equal to or greater than (to within an order of magnitude) a work day. In the chart 500, for example, access to known internet sites may be requested for up to 12 hours, which may allow a user to access the known internet sites for substantially an entire workday, based on a single interaction with the access control system.

In certain embodiments, a computer resource which may represent a greater potential security threat, such as access to run restricted programs, may be correspondingly set to a smaller maximum time duration, such as 60 minutes (as shown in the chart 500), 30 minutes, etc. A shorter maximum time duration may correspond to a shorter task time for the computer resource. The shorter maximum time duration may be used, such as by the access control system, to restrict access to the computer resource more quickly and may thereby limit impact of malicious actors if other security measures are overcome. The minimum and maximum time durations may also vary depending on users, such as shorter time durations for enterprise users, longer time durations for members of information security teams, etc. The minimum and maximum time durations may vary depending on tasks to be performed, such as task identified as a business justification in reference to FIG. 4A. For example, a drop-down menu may provide example task which may correspond to specific minimum and maximum time durations for computer resource access. In a specific example, access to an external system may have different minimum and maximum time durations for different external systems. Access to a known external system may be allowed a longer maximum time duration that access to a unknown external system, such as a previously unreviewed external system (e.g., an external system to which the user or the enterprise is connecting for the first time).

FIGS. 6A-6B are schematic views illustrating an example user interface and alert, respectively, for user identity verification for access control, in accordance with some embodiments of the present disclosure. FIG. 6A depicts a schematic view of an example user verification interface 600. The user verification interface 600 may be part of the access control system or may be in communication with the access control system. For example, the user verification interface 600 may be part of a an authentication system, such as the authenticator 138 of FIG. 1. The user verification interface 600 may include a text box 610, drop down menu, or other input element, which may allow a user to provide a user identification, such as a user ID, employee number, etc. The user verification interface 600 may include a text box 612, drop down menu, or other input element, which may allow to provide a second (or other multi) factor for user verification. The text box 612 may instead or additionally be another type of authentication, including another type of input such as biometric scanner, microphone for voice recognition, etc.

The factor for user verification may be a passcode (such as a pin and a token), which may uniquely identify the user at an instance in time. The passcode may include a code specific to the user and a random or pseudo-random element, such as an alphanumeric code. The passcode may be obtained from another device, such as from a random number generator, text message service, etc. which may be possessed by or in communication with the user. The user verification interface 600 may be provided by a user verification service or system which interfaces with the access control system. The user verification interface 600 may include a link or other option for help 618 or explanations of the various options for a user. The user interface 600 may include a link or other option to submit 624 the request for user verification. The user interface 600 may include a link or other option to cancel 626 the request for the computer resource.

FIG. 6B depicts a schematic view of an example permitted computer resource access notification 650. Once a user verification is complete (or at another point in the process at which the user request for computer access is approved), a notification may be displayed to the user indicating that the requested computer resource is available for access. The notification 650 may include a time duration for access, an end time when access will be revoked, etc. Once access to the computer resource is approved, a user interface, such as the user interface 300 of FIG. 3, may be updated to reflect the current status of the computer resource.

Figure 7:
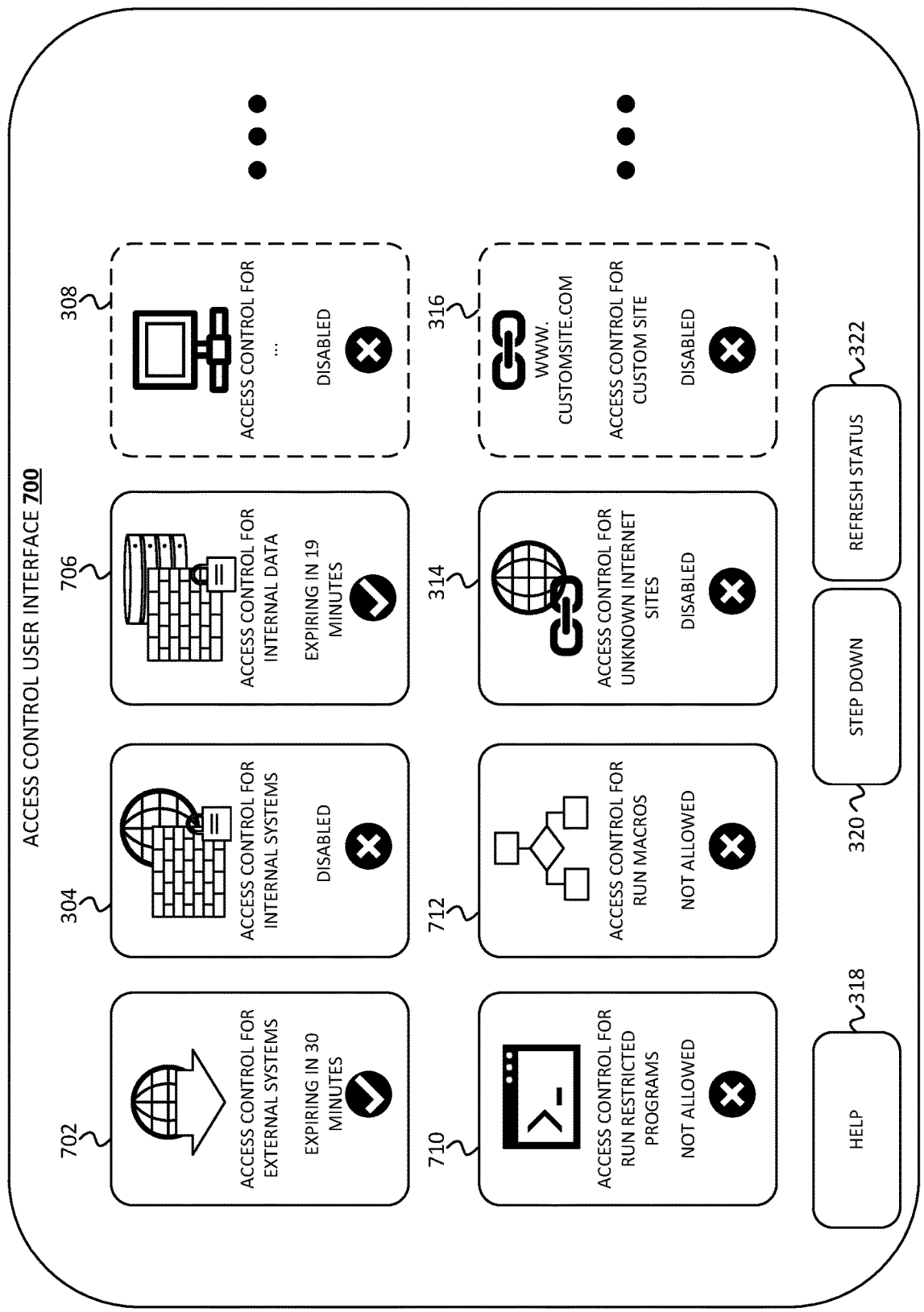
FIG. 7 is a schematic view illustrating an example user interface for access control to computer resources, in accordance with some embodiments of the present disclosure.

FIG. 7 is a schematic view illustrating an example user interface 700 for access to computer resources, in accordance with some embodiments of the present disclosure. The user interface 700 may be a version of the user interface 300 of FIG. 3 for a given user (e.g., a user not permitted access to run restricted programs 710 or access to run macros 712) for the user after they have request and been allowed access to external systems 702 and internal data 706. The user interface 700 may be personalized based on the computer resources available to the user for requesting of access. Computer resources which are not available to the user, such as access to run restricted programs and access to run macros, may be indicated by a "not allowed" label, grayed out, etc. The user interface 700 may be updated to display which computer resources the user current has access to, such as access to external systems 702 and access to internal data 706. The user interface may indicate how long of a duration access remains for, and may be updated (such as every minute) to reflect changed in the time duration, duration of access (such as if a subsequent request for computer access is approved), etc. At the end of the duration time for access to the computer resource, the user interface 700 may change, such as due to step down, to indicate that the computer resource is no longer available. The user may be required to step up a computer resource to reenable access to the computer resource. The user may also be able to step down a computer resource before an access period or time duration of the access period has ended. The user may select a link to step down 320 from the user interface 700 to step down one or more computer resources which are stepped up.

FIGS. 8A-8B are schematic views illustrating an example user interface and alert, respectively, for step down of access, in accordance with some embodiments of the present disclosure. FIG. 8A depicts a schematic view of a step-down user interface 800. The step-down user interface 800 may allow a user to revoke access to a computer resource or otherwise step down access to a computer resource to which they are entitled, have previously requested, etc. before the expiration of such access. The user may select a link to step down, such as from the user interface 700, which may cause the step-down user interface 800 to be displayed. The step-down user interface 800 may display a chart 802 or other visual or text representation of one or more computer resources which is currently stepped up. For each computer resource which is currently stepped up, a step down 824 link or other indicator may be provided. A user may select the step down 824 link to step down a given computer resource. The step down user interface 800 may include a link or other option for help 818 or explanations of the various options for a user. The user interface 800 may include a link or other option to cancel 826 the request to step down one or more computer resources. Once a computer resource has been successfully stepped down, such as by an action of the user in the user interface 800, a notification may be displayed to the user.

FIG. 8B depicts a schematic view of an example step-down user notification 850. Once a user-initiated step down is complete (or a timer-based step down in complete), a notification may be displayed to the user indicating that the computer resource is stepped down or that the step down request has been completed. The notification 850 may include an indication of which computer resource access has been stepped down for, a link to request access to the computer resource (such as, for example, if the step down request was made in error or the user has reconsidered their need for the computer resource), etc. Once access to the computer resource is stepped down, a system user interface, such as the user interface 700 of FIG. 7, may be updated to reflect the current status of the computer resource.

FIG. 9 depicts a chart 900 listing example user group types and statuses for access control, in accordance with some embodiments of the present disclosure. The chart 900 lists groups to which a user may be added. The user groups may be classified for each computer resource, for sets of computer resources (for example, for multiple websites), etc. For each computer resource for which a user may step up (e.g., each computer resource the user is entitled to request access to), the user may be added to a StepUpEnabled list or group. Membership in the StepUpEnabled group may indicate that the user is enabled to step up for a given computer resource. A user may be added to a group based on a job description or employment-based tasks. For example, a recruiting employee may be added to a StepUpEnabled group for a set of career-based websites (e.g., job search websites, social media websites, etc.). A user may be added to a group based on a user request (such as by contacting information security and presenting a case for specific access). A StepUpEnabled group may correspond to multiple computer resources, a single website, etc. A user may have a control status applied within the StepUpEnabled group. A user may be enabled (or able to be stepped up) or disabled (or not able to be stepped up).

Each user of the access control system may be added to a Scope group. The Scope group or list may define which users use the access control system. Within the Scope group, a user may have permissions for each of the computer resources. A user may not be allowed, or restricted from stepping up a given computer resource. A user may be disabled, where the user is allowed to request stepping up of a given computer resource but is not currently stepped up. A user may be enabled, in which case the user is currently stepped up for the given computer resource.

During some operations, such as a "Break Glass" operation, the access control system may be disabled. Disabling of the access control system may occur for some users, for all users, or a combination thereof. When the access control system is disabled for a user for a given computer resource, the user may be added to a Scope_Disabled group, for which the user is then enabled (e.g., without requesting access) to the given computer resource.

Each user of the access control system may have access to a given computer resource further controlled by a Local Control. The Local Control may be used to step up a user for a limited time duration, such as controlled by a timer based on the initially requested access time. For an active timer, the user may be enabled by the Local Control, such that the user may be stepped up for the timer duration. If no timer is active, the user may be disabled by the Local Control, such that the user is stepped down.

During Break Glass or other operations, one or more users may be added to a Break Glass group, for which all computer resources may be stepped up. Users may be added to and removed from this group as necessary during Break Glass and other procedures. This group may be used to remove restrictions on access during certain time periods such as for training exercises.

FIG. 10 depicts a chart 1000 listing example groups and purposes for access control, in accordance with some embodiments of the present disclosure. The chart describes various computer resources and various groups, with respect to each of the computer resources, to into which users may be grouped. A user may be added to a Scope group for a given computer resource, which allows the system to control the user's access for the given computer resource. The Scope group may default to restricting the user's access of the given computer resource. A user may be added to a StepUpEnabled group if the user is allowed to request access to the given computer resource. The StepUpEnabled group may still default to restricting the user's access to the given computer resource, but may allow the user to request access using the system.

Figure 11:
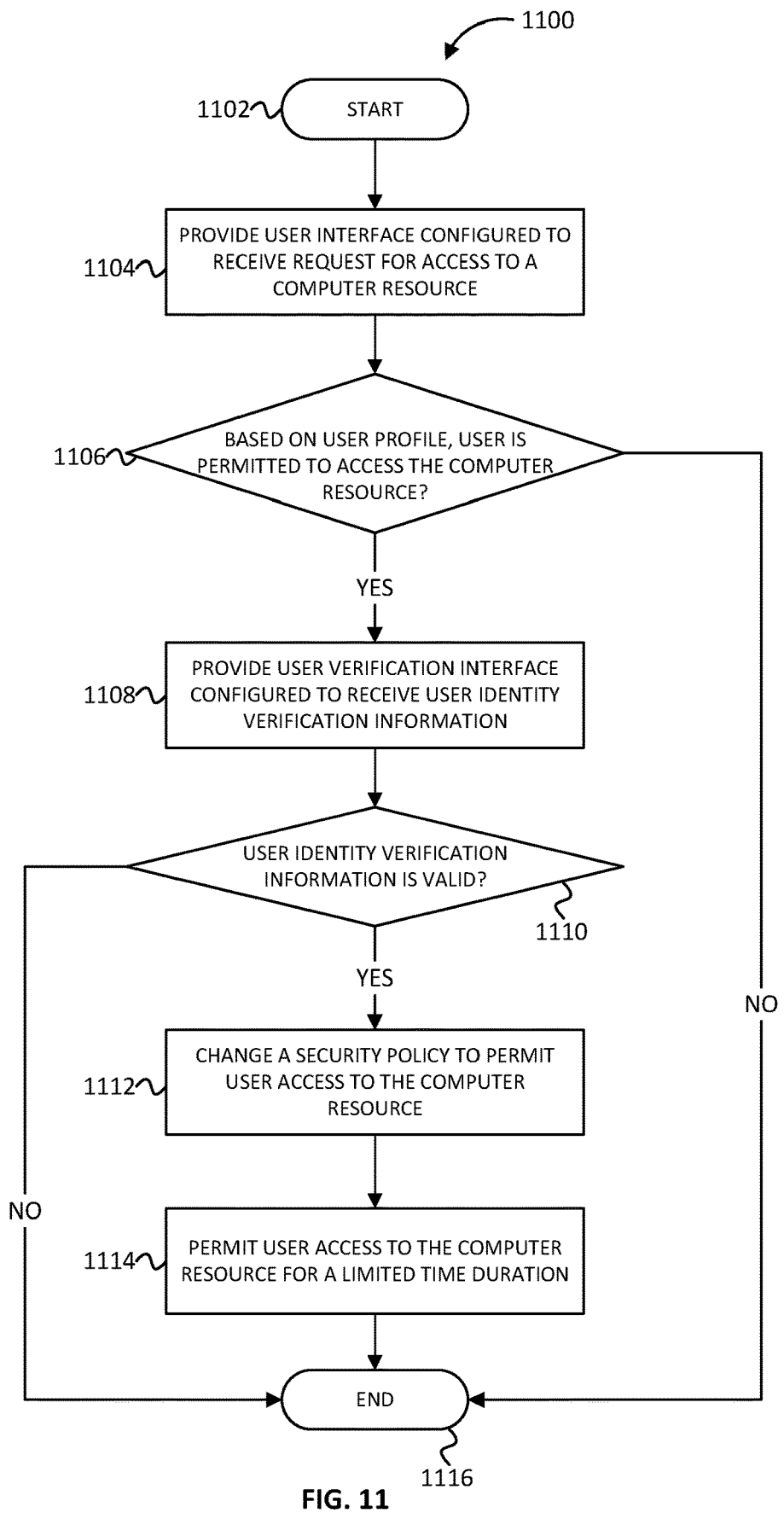
FIG. 11 is a flow chart illustrating a method for enabling access to computer resources, in accordance with some embodiments of the present disclosure.

FIG. 11 is a flow chart illustrating an example method for enabling access to computer resources, in accordance with some embodiments of the present disclosure. FIG. 11 depicts example operations for a method 1100. At block 1102, in some embodiments, an access control system may be triggered. The control system may be triggered by startup of a user computing device, by logging in of the user, based on a push request from a server in communication with the user computing device, etc.

At block 1104, in some embodiments, a user interface configured to receive a request for access to a computer resource may be provided. The user interface may be any appropriate user interface, including the user interface 300 previously described in reference to FIG. 3. The user interface may receive a request for access to the computer resource. The user interface may receive, such as in the request or as part of the request, information about the user (e.g., a user identifier), information about the computer resource requested, information about the time duration of the request, etc.

At block 1106, it may be determined if the user is permitted to access a requested computer resource, such as based on the user profile. The user profile may be information about the user stored in an active directory. The user profile may be membership of the user in one or more group or list. The user profile may include a set of user permissions associated with the user. The user profile may be accessed based on a user identification (ID), such as a login ID, employee number, alphanumeric ID, etc. The user profile may be loaded for a user device. The user profile may be stored on the user device. The user profile may be loaded on to the user device based on the user logging into the user device itself or another agent, client, application, etc. on the user device. In some embodiments, the user profile may be anonymized The user profile may contain the user name, group membership, expected tasks, etc. for a user. The user profile may indicate which computer resources, such as based on group membership, the user may request access to. The user profile may indicate a minimum and maximum time duration for access to a computer resource that the user is allowed to request access to. If the user is permitted to access the computer resource, flow may continue to block 1108. If the user is not permitted to access the computer resource, flow may terminate at block 1116. If the user is not permitted to access the computer resource, the user may be notified (such as by a notification 450 of FIG. 4B) or may not be notified.

At block 1108, a user identity verification interface configured to receive user identity verification information may be provided. The user verification interface may be any appropriate user verification interface, including a multi-factor authentication interface, such as the user verification interface 600 of FIG. 6A. The user verification interface may be provided by an appropriate user verification application, system, apparatus, etc. The user verification interface may be provided by an agent, such as OpenID Connect 132 of FIG. 1, by a multi-factor authentication agent, such as the multi-factor authenticator 138 of FIG. 1, etc. The user may enter user identity verification information into the user identity verification interface. After the user identity verification information is provided, a user verification service, agent, etc. may indicate the validity of the user identity verification information, such as to the access control system. The user identity verification information itself may be hidden from the access control system, such that the access control system receives information about validity of the user identity verification information but not the user identity verification information itself. Alternatively, the access control system may verify the user identity verification information, such as based on the user profile, based on a multi-factor authentication indication, such as a time-synched token, etc.

At block 1110, it may be determined if the user identity verification information is valid. If the user identity verification information is valid, flow may continue to block 1112. User identity verification information validity may be determined based on multi-factor authentication. If the user identity verification information is not valid, flow may terminate at block 1116. The user may or may not be notified that user identity verification has failed.

At block 1112, a security policy associated with the user to permit the user to access the computer resource. The security policy associated with the user may be stored in a user profile or otherwise attached to the user. The change in the security policy associated with the user may change the configuration of a network resource. For example, a security policy of the user may govern how the user interacts with the network resource. The change in the security policy may change a user's relationship to a firewall, to a web proxy, to a port, to an access management agent, etc. The security policy change may change from a default configuration, which may be a security policy blocking access, to an elevated access security policy. The security policy change may allow the user to access the computer resource. The security policy change may be logged. The security policy may be queried when the user attempts to access a computer resource. The security policy may be periodically queried, such as every minute, every 30 seconds, every 15 minutes, etc. in order to determine the user's allowed computer resources.

At block 1114, the user may be allowed to access the computer resource for a limited time. The limited time may be a requested access time, such as described in reference to the computer resource request interface 400 of FIG. 4A. The limited time may be tolled by a timer. The limited time may be a default time duration. At the conclusion of the limited time, the security policy may be changed to restrict the user from access to the computer resource. The change in the security policy may change how the user interacts with a given computer resource—such as by disallowing access. The security policy change may be a change back to a default configuration which restricts access to the computer resource.

Figure 12:
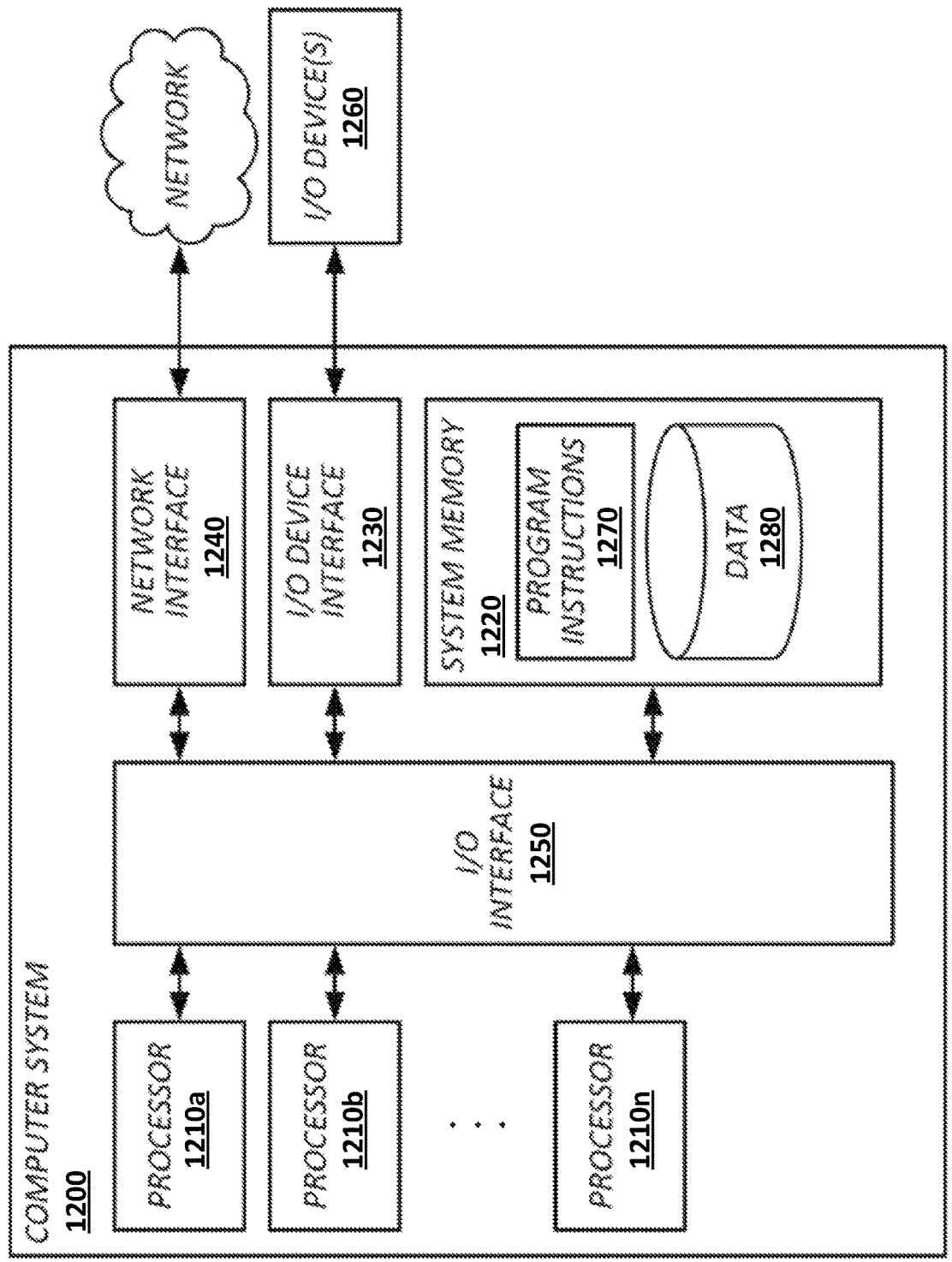
FIG. 12 is a schematic of a computing system, in accordance with some embodiments of the present disclosure.

FIG. 12 is a schematic of a computing system, in accordance with some embodiments of the present disclosure. FIG. 12 is a diagram that illustrates an exemplary computing system 1200 in accordance with embodiments of the present disclosure. Various portions of systems and methods described herein may include or be executed on one or more computing systems similar to computing system 1200. Further, processes and modules described herein may be executed by one or more processing systems similar to that of computing system 1200.

Computing system 1200 may include one or more processors (e.g., processors 1210*a*-1210*n*) coupled to system memory 1220, an input/output I/O device interface 1230, and a network interface 1240 via an input/output (I/O) interface 1250. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1200. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1220). Computing system 1200 may be a uni-processor system including one processor (e.g., processor 1210*a*), or a multi-processor system including any number of suitable processors (e.g., 1210*a*-1210*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, e.g., an FPGA (field programmable gate array) or an ASIC (application specific integrated circuit). Computing system 1200 may include a plurality of computing devices (e.g., distributed computing systems) to implement various processing functions.

I/O device interface 1230 may provide an interface for connection of one or more I/O devices 1260 to computing system 1200. I/O devices may include devices that receive input (e.g., from a user) or output information (e.g., to a user). I/O devices 1260 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1260 may be connected to computing system 1200 through a wired or wireless connection. I/O devices 1260 may be connected to computing system 1200 from a remote location. I/O devices 1260 located on remote computing system, for example, may be connected to computing system 1200 via a network and network interface 1240.

Network interface 1240 may include a network adapter that provides for connection of computing system 1200 to a network. Network interface 1240 may facilitate data exchange between computing system 1200 and other devices connected to the network. Network interface 1240 may support wired or wireless communication. The network may include an electronic communication network, such as the Internet, a local area network (LAN), a wide area network (WAN), a cellular communications network, or the like.

System memory 1220 may be configured to store program instructions 1270 or data 1280. Program instructions 1270 may be executable by a processor (e.g., one or more of processors 1210*a*-1210*n*) to implement one or more embodiments of the present techniques. Instructions 1270 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1220 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 1220 may include a non-transitory computer readable storage medium that may have program instructions stored thereon that are executable by a computer processor (e.g., one or more of processors 1210*a*-1210*n*) to cause the subject matter and the functional operations described herein. A memory (e.g., system memory 1220)

may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1250 may be configured to coordinate I/O traffic between processors 1210a-1210n, system memory 1220, network interface 1240, I/O devices 1260, and/or other peripheral devices. I/O interface 1250 may perform protocol, timing, or other data transformations to convert data signals from one component (e.g., system memory 1220) into a format suitable for use by another component (e.g., processors 1210a-1210n). I/O interface 1250 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 1200 or multiple computing systems 1200 configured to host different portions or instances of embodiments. Multiple computing systems 1200 may provide for parallel or sequential processing/execution of one or more portions of the techniques described herein.

Those skilled in the art will appreciate that computing system 1200 is merely illustrative and is not intended to limit the scope of the techniques described herein. Computing system 1200 may include any combination of devices or software that may perform or otherwise provide for the performance of the techniques described herein. For example, computing system 1200 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 1200 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 1200 may be transmitted to computing system 1200 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computing system configurations.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 1200 may be transmitted to computing system 1200 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computing system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to cost constraints, some techniques disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computing system" performing step A and "the computing system" performing step B may include the same computing device within the computing system performing both steps or different computing devices within the computing system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and may be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

It should be understood that the present invention is not limited to the above-described techniques, features or aspects. Instead, the specific details described above are disclosed as example forms of implementing the claims, as set forth below.

What is claimed is:

1. A method for enabling access to a computer resource comprising:
    providing, by a computer system, to a user an interface configured to receive a request for access to the computer resource;
    determining, by the computer system, if the user is permitted to access the computer resource based on a user profile of the user;
    providing, by the computer system, a user verification interface configured to receive user identity verification information;
    determining, by the computer system, if the user identity verification information is valid in response to a reply to the request for user identity verification information received from the user; and
    in response to determining that the user is permitted access to the computer resource and that the user verification information is valid:
        updating a security policy to reflect that the user is permitted to access the computer resource,
        providing access to the computer resource for a limited time duration;
        updating the security policy to reflect that the user is no longer permitted access to the computer resource upon expiration of the limited time duration; and
        logging of the updating of the security policy to reflect that the user is no longer permitted access to the computer resource upon expiration of the limited time duration.

2. The method of claim 1, wherein providing access to the computer resource for the limited time duration further comprises, upon expiration of the limited time duration, updating the security policy to reflect that the user is no longer permitted access to the computer resource.

3. The method of claim 1, wherein the interface configured to receive a request for access to the computer resource is further configured to receive a requested time duration and wherein providing access to the computer resource for the limited time duration comprises providing access to the computer resource for the requested time duration.

4. The method of claim 2, wherein the interface is further configured to receive a request for an additional time duration increment and wherein providing access to the computer resource for the limited time duration comprises providing access to the computer resource for the additional time duration increment.

5. The method of claim 1, wherein the computer resource is an internal computer resource.

6. The method of claim 1, wherein the computer resource is an external computer resource.

7. The method of claim 1, wherein the computer resource is a physical media or a physical media drive.

8. The method of claim 1, wherein the computer resource is a program or executable on a restricted list.

9. The method of claim 1, wherein the computer resource is one or more external internet locations.

10. The method of claim 1, further comprising changing a configuration of a network resource based on the updated security policy.

11. The method of claim 10, further comprising blocking, by the computer system, access to the computer resource by a blocking configuration of the network resource associated with the user and wherein changing the configuration of the network resource comprises changing the configuration from the blocking configuration of the network resource to a permitted configuration of the network resource.

12. The method of claim 11, further comprising, upon expiration of the limited time duration, changing the permitted configuration of the network resource to the blocking configuration of the network resource.

13. The method of claim 12, wherein changing the configuration to the permitted configuration of the network resource comprises opening an access point in a firewall.

14. The method of claim 12, wherein the blocking configuration of the network resource is a default configuration.

15. The method of claim 1, further comprising logging, by the computer system, the request for access to the computer resource.

16. The method of claim 15, further comprising logging a result of the determining if the user is permitted to access the computer resource based on the user profile of the user in association with the request for access to the computer resource.

17. The method of claim 15, further comprising logging a result of the determining if the user identity verification information is valid in association with the request for access to the computer resource.

18. The method of claim 1, wherein the user interface is further configured to receive a business justification for the request for access to the computer resource.

19. The method of claim 18, further comprising logging, by the computer system, the business justification for the request for access to the computer resource.

20. The method of claim 1, further comprising logging, by the computer system, of the updating of the security policy to reflect that the user is permitted access to the computer resource.

21. A method for enabling access to a computer resource comprising:
    providing, by a computer system, to a user an interface configured to receive a request for access to the computer resource;
    determining, by the computer system, if the user is permitted to access the computer resource based on a user profile of the user;
    providing, by the computer system, a user verification interface configured to receive user identity verification information;
    determining, by the computer system, if the user identity verification information is valid in response to a reply to the request for user identity verification information received from the user; and in response to determining that the user is permitted access to the computer resource and that the user verification information is valid:
    updating a security policy to reflect that the user is permitted to access the computer resource;
    logging the updating of the security policy to reflect that the user is permitted access to the compute resource;
    providing access to the computer resource for a limited time duration;
    updating the security policy to reflect that the user is no longer permitted access to the computer resource upon expiration of the limited time duration; and
    logging of the updating of the security policy to reflect that the user is no longer permitted access to the computer resource upon expiration of the limited time duration.

22. A system for enabling access to a computer resource comprising:
    a computer system having a processor and a memory; and
    one or more code sets stored in the memory and executed by the processor to:
        provide a user interface to a user on a user device, the user interface configured to receive a request for access to the computer resource;
        determine if the user is permitted to access the computer resource based on a user profile of the user;
        provide a user verification interface configured to receive user identity verification information;
        determine if the user identity verification information is valid in response to a reply to the request for user identity verification information received from the user; and
        in response to a determination that the user is permitted access to the compute resource and that the user verification information is valid:
            update a security policy to reflect that the user is permitted to access the computer resource;
            provide access to the computer resource by the user device for a limited time duration;
            update the security policy to reflect that the user is no longer permitted access to the computer resource upon expiration of the limited time duration; and
            log the updating of the security policy to reflect that the user is no longer permitted access to the computer resource upon expiration of the limited time duration.

23. The system of claim 22, wherein instructions to determine if the user identity verification information is valid comprise instructions to determine if the user identity verification information is valid based on multi-factor authentication.

24. The system of claim 22, wherein instructions to determine if the user is permitted to access the computer resource comprise instructions to compare the user profile to an allow list, a block list, or both.

25. The system of claim 22, further comprising a database of user profiles and permissions, wherein instructions to determine if the user is permitted to access the computer resource comprise instructions to determine if the user is permitted to access the computer resource based on the permissions for the user profile in the database.

26. The system of claim 22, wherein the user interface is configured to receive a request corresponding to one of multiple computer resources and wherein instructions to determine if the user is permitted access to the computer resource comprise instructions to determine if the user is permitted access to the one of the multiple computer resources.

27. The system of claim 26, wherein instructions to provide the user interface comprise instructions to:
    determine a set of computer resources the user is permitted to access based on the user profile of the user; and
    provide the user interface to the user, the user interface configured to receive requests for access to the set of computer resources.

28. The method of claim 1, further comprising:
    subsequent to the logging of the updating of the security policy to reflect that the user is no longer permitted access to the computer resource upon expiration of the limited time duration, receiving an additional request for access to the computer resource from the user;
    in response to receiving the additional request,
        determining if the user is permitted to access the computer resource based on the user profile of the user;
        providing the user verification interface configured to receive the user identity verification information;
        determining if the user identity verification information is valid in response to an additional reply to the request for user identity verification information received from the user; and
        in response to determining that the user is permitted access to the computer resource and that the user verification information is valid:
            updating a security policy to reflect that the user is permitted to access the computer resource, and
            providing access to the computer resource for an additional limited time duration.

29. The method of claim 28, wherein determining if the user is permitted to access the computer resource based on the user profile of the user in response to the additional request comprises determining if the user is permitted to access the computer resource based on the user profile of the user when the additional request is received, wherein providing the user verification interface configured to receive the user identity verification information in response to the additional request comprises providing an additional user verification interface configured to receive additional user identity verification information, and wherein determining if the user identity verification information is valid in response to the additional reply to the request for user identity verification information received from the user in response to the additional request comprises determining if the user identity verification information is valid when the reply to the request for user identity verification information is received.

30. A system for enabling access to a computer resource comprising:
    a computer system having a processor and a memory; and
    one or more code sets stored in the memory and executed by the processor to:
        provide, by a computer system, to a user an interface configured to receive a request for access to the computer resource;
        determine, by the computer system, if the user is permitted to access the computer resource based on a user profile of the user;
        provide, by the computer system, a user verification interface configured to receive user identity verification information;
        determine, by the computer system, if the user identity verification information is valid in response to a reply to the request for user identity verification information received from the user; and in response to a determination that the user is permitted access to the computer resource and that the user verification information is valid:
- update of a security policy to reflect that the user is permitted to access the computer resource;
- log the updating of the security policy to reflect that the user is permitted access to the compute resource;
- provide access to the computer resource for a limited time duration;
- update the security policy to reflect that the user is no longer permitted access to the computer resource upon expiration of the limited time duration; and
- logging of the updating of the security policy to reflect that the user is no longer permitted access to the computer resource upon expiration of the limited time duration.

* * * * *

UNITED STATES PATENT AND TRADEMARK OFFICE
CERTIFICATE OF CORRECTION

PATENT NO. : 11,855,997 B1
APPLICATION NO. : 18/174234
DATED : December 26, 2023
INVENTOR(S) : Christian Constantin Adam et al.

It is certified that error appears in the above-identified patent and that said Letters Patent is hereby corrected as shown below:

In the Claims

Column 25, Line 35 (Claim 1), delete "the request for user identity" and insert --a request for user identity--;

Column 25, Line 57 (Claim 3), delete "a request for access" and insert --the request for access--;

Column 26, Line 66 (Claim 21), delete "the request for user identity" and insert --a request for user identity--;

Column 27, Line 32 (Claim 22), delete "the request for user identity" and insert --a request for user identity--;

Column 29, Line 1 (Claim 30), delete "the request for user identity" and insert --a request for user identity--.

Signed and Sealed this
Twenty-first Day of May, 2024

Katherine Kelly Vidal
*Director of the United States Patent and Trademark Office*